(12) United States Patent
Bell (10) Patent No.: US 7,717,596 B1
(45) Date of Patent: May 18, 2010

(54) REARVIEW MIRROR ASSEMBLY WITH RUNNING LIGHTS

(76) Inventor: Alan Bell, 651 Powder House Rd., Vestal, NY (US) 13850

( * ) Notice: Subject to any disclaimer, the term of this patent is extended or adjusted under 35 U.S.C. 154(b) by 81 days.

(21) Appl. No.: 11/182,258

(22) Filed: Jul. 15, 2005

(51) Int. Cl.
*B60Q 1/26* (2006.01)
*B60Q 1/00* (2006.01)

(52) U.S. Cl. .................. 362/494; 362/459; 362/487; 362/498; 362/499; 362/800

(58) Field of Classification Search ............... 362/494, 362/487, 459, 800, 498, 499
See application file for complete search history.

(56) References Cited

U.S. PATENT DOCUMENTS

| | | | |
|---|---|---|---|
| 4,882,565 A * | 11/1989 | Gallmeyer | 340/461 |
| 5,788,357 A | 8/1998 | Muth et al. | |
| 5,938,320 A * | 8/1999 | Crandall | 362/494 |
| 6,005,724 A | 12/1999 | Todd | |
| 6,045,243 A | 4/2000 | Muth et al. | |
| 6,076,948 A | 6/2000 | Bukosky et al. | |
| 6,142,656 A * | 11/2000 | Kurth | 362/494 |
| 6,257,746 B1 | 7/2001 | Todd et al. | |
| 6,264,353 B1 * | 7/2001 | Caraher et al. | 362/494 |
| 6,441,943 B1 | 8/2002 | Roberts et al. | |
| 6,512,624 B2 * | 1/2003 | Tonar et al. | 359/265 |
| 6,572,233 B1 * | 6/2003 | Northman et al. | 359/839 |
| 6,657,767 B2 * | 12/2003 | Bonardi et al. | 359/265 |
| 6,749,325 B2 | 6/2004 | Bukosky et al. | |
| 7,008,091 B2 * | 3/2006 | Mathieu et al. | 362/494 |
| 2004/0080958 A1 * | 4/2004 | Bukosky et al. | 362/494 |
| 2005/0237757 A1 * | 10/2005 | Weng | 362/494 |
| 2006/0255960 A1 * | 11/2006 | Uken et al. | 340/815.4 |

* cited by examiner

*Primary Examiner*—Sandra L O'Shea
*Assistant Examiner*—Sean P Gramling
(74) *Attorney, Agent, or Firm*—Mark Levy; David W. Dranchak; Hinman, Howard & Kattell (57) ABSTRACT

A family of rearview mirror assemblies for motorized vehicles. Each assembly includes a housing, a mirror with at least one multidimensional graphical image etched through the reflective layer and illuminated by light sources such as LEDs located within the housing and behind the graphical image(s). The mirror assemblies operate properly with or without an external flashing circuit. The light source is energized at a first light level during normal operation of the vehicle to function as running lights, decorative lighting or accent lighting. When the light source is operated at a second light level (either higher or lower), the lighted graphical images may also provide additional functionality. The exterior rearview mirror assembly may optionally include additional light sources, light from which is viewable outside of the outer surface of the housing.

14 Claims, 8 Drawing Sheets

REARVIEW MIRROR ASSEMBLY WITH RUNNING LIGHTS

FIELD OF THE INVENTION

The present invention relates to backlit etched mirror technology and, more particularly, to backlit rearview mirrors for motorized vehicles that use the backlit multidimensional graphical images primarily as running lights.

BACKGROUND OF THE INVENTION

One or a pair of exterior rearview mirrors have been used on the sides of motorized vehicles such as motorcycles, trucks and automobiles for many years. The primary purpose of the mirrors was to provide the driver of the vehicle with information about other vehicles behind and on the side of his own vehicle.

Vehicles are required to include such indicators as brake lights, turn signals and hazard indicators. Turn signals, however, are commonly mounted only on the very front and rear portions of the vehicle. In many instances a driver in a second vehicle adjacent a first vehicle may not be able to adequately view the turn signals of the first vehicle due to his relative position to the front or rear of the first mentioned vehicle.

In the last decade, functionality has been added to exterior rearview mirrors to improve the safety of the passengers thereof. It is highly desirable to provide adjacent vehicles with information concerning a vehicle operator's intentions. Providing additional information to adjacent vehicles has been the subject of several patents. U.S. Pat. No. 6,076,948, issued to Bukosky et al. for ELECTROMAGNETIC RADIATION EMITTING OR RECEIVING ASSEMBLY and U.S. Pat. No. 6,749,325, issued to Bukosky et al. for SIGNALING ASSEMBLY disclose light sources such as light emitting diodes (LEDs), and mechanisms for allowing the light to be shaped and seen through the mirrors. These mechanisms project light through a shaped template attached to a semi-transparent mirror. A simple shape such as an arrow or a series of dots forming the overall shape of an arrow are etched into the reflective layer on a mirror.

U.S. Pat. No. 6,441,943, issued to Roberts et al. for INDICATORS AND ILLUMINATORS USING A SEMICONDUCTOR RADIATION EMITTER PACKAGE shows an exterior rearview mirror including a keyhole illuminator implemented by the inclusion of a high power LED within the mirror to produce light to illuminate the door handle and the keyhole of an automobile door. If the light were instead directed toward the ground, it would function as a puddle lamp.

It is significant to note that exterior rearview mirrors of the prior art that include a light source to project light through the mirror have the light source turned off as the default condition. The light source is then activated to provide information to the operator of another vehicle that a turn is about to be made, or to the passenger of a vehicle that a door of his vehicle has been unlocked and he may now enter the vehicle.

For interior rearview mirrors for motorized vehicles, as shown in U.S. Pat. No. 4,882,565, issued to Gallmeyer et al. for INFORMATION DISPLAY FOR REARVIEW MIRRORS, a light source within the housing of the mirror has been included to illuminate simple images that provide warnings or information to the occupants of the vehicle to which the mirror is attached.

But given the effort and money that people today spend to customize their motorized vehicles, it is desirable to provide an exterior rearview mirror with a plurality of light sources energized at a first light level during normal operation of the vehicle to illuminate a plurality of multidimensional graphical images. The lighted graphical images can function as running lights, decorative lighting or accent lighting. Also, if the light sources are operated at a second light level (either higher or lower), the illuminated graphical images may also provide a secondary function. It is also desirable to provide an interior rearview mirror that can illuminate a plurality of multidimensional graphical images where the illuminated graphical images function as running lights, decorative lighting or accent lighting.

It is therefore an object of the invention to provide a rearview mirror for motorized vehicles that includes a plurality of illuminated multidimensional graphical images that function as running lights, decorative lighting or accent lighting.

It is another object of the invention to provide an exterior rearview mirror for motorized vehicles that includes a plurality of illuminated multidimensional graphical images that can provide additional functionality.

It is still another object of the invention to provide a rearview mirror for motorized vehicles that includes a plurality of illuminated multidimensional graphical images that is reliable and readily manufacturable.

SUMMARY OF THE INVENTION

The present invention provides rearview mirror assemblies intended to be mounted to a motorized vehicle such as but not limited to an automobile, a truck, a motorcycle or a snowmobile. Each assembly includes a housing and a mirror mounted to the housing. At least one multidimensional graphical image is etched through the reflective layer, which preferably is located on the inner surface the transparent substrate of the mirror. At least one light source illuminates the etched graphical image. The light source preferably is diffused and is implemented as a plurality of light emitting diodes attached to a printed circuit board (PCB) along with any necessary electronic circuitry.

The light source of the exterior embodiment is energized at a first light level during normal operation of the vehicle. In this manner, the illuminated etched graphical image functions as running lights, decorative lighting or accent lighting. If the light source is operated at a second light level, the illuminated graphical image may also provide additional functionality such as a turn signal, a brake light or a hazard indicator.

The exterior embodiment may also include additional arrays of light sources on the surface of the housing. The exterior embodiments operate properly if an external flashing circuit is present, but circuitry is included within the housing or case so that an external flashing circuit is not required. If multiple light sources are used to illuminate the graphical images, electronic circuitry may be used to program how and when the light sources operate to provide effects such as the sequencing of the lights, flashing lights or dimming lights. The light sources may be of more than a single color, intensity and technology.

The technology used in the inventive family of interior embodiments is basically the same as for the exterior embodiments with the primary difference being that the lighted, etched graphical image(s) are used only as running lights, decorative lighting or accent lighting.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Generally speaking, the present invention provides a family of rearview mirror assemblies intended to be mounted to a motorized vehicle such as but not limited to an automobile, a truck, a motorcycle or a snowmobile. Each assembly includes a housing and a mirror mounted to the housing. At least one multidimensional graphical image is etched through the reflective layer, which preferably is located on the inner surface of the transparent substrate of the mirror. At least one light source illuminates the etched graphical image. The light source preferably is diffused and is implemented as a plurality of light emitting diodes (LEDs) attached to a printed circuit board (PCB) along with any necessary electronic circuitry.

Figure 1:
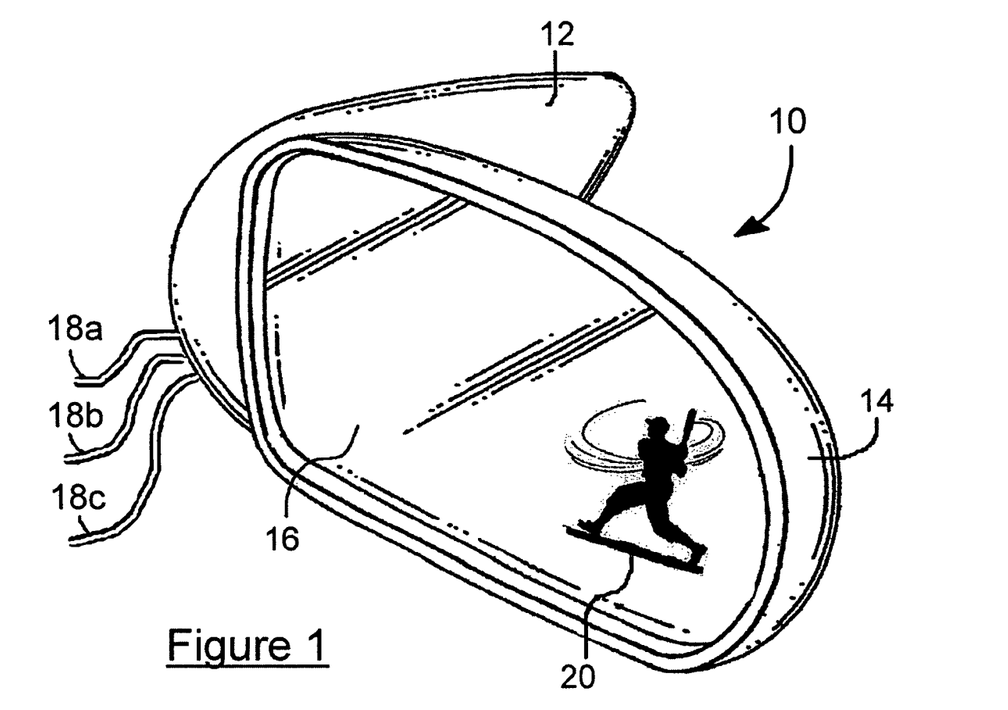
FIG. 1 is a front elevational view of an exterior rearview mirror assembly including a mirror with an etched multidimensional graphical image in accordance with one embodiment of the present invention.

Referring first to FIG. 1, there is shown a front elevational view of an exterior rearview mirror assembly 10 for mounting to a motorized vehicle (not shown) in accordance with one embodiment of the present invention. Exterior rearview mirror assembly 10 is mounted to a motorized vehicle by an applique 12. Applique 12 may be fixedly mounted to housing 14. Applique 12 may also be mounted to housing 14 in a breakaway mirror assembly. Both methods for mounting applique 12 to housing 14 are commonly known in the art and may be implemented in an exterior rearview mirror.

A mirror element 16 is mounted within housing 14. Mirror element 16 is attached to housing 14 in this embodiment by an adhesive (not shown). Other methods such as clamping may also be used to retain mirror element 16 to the housing 14. Wires 18a, 18b and 18c are used to provide power, ground and a control signal, respectively to the mirror assembly 10. Multidimensional graphical image 20, which is etched through the reflective layer 24 and optionally the substrate 22 (FIG. 3) of mirror element 16 is illuminated to provide running lights, decorative lighting or accent lighting. As shown, image 20 in this instance is a representation of a baseball player and is much more visible when illuminated. In this application, applique 12 and housing 14 are preferably formed of a polymeric material to minimize weight.

Figure 2:
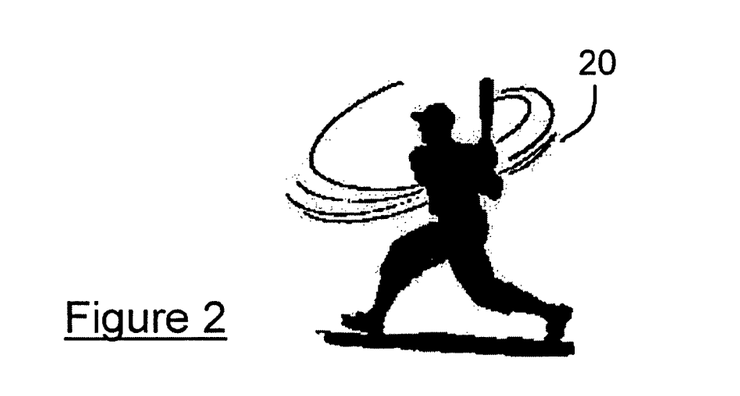
FIG. 2 is an enlarged two-dimensional view of the multidimensional graphical image shown in FIG. 1.
Figure 3:
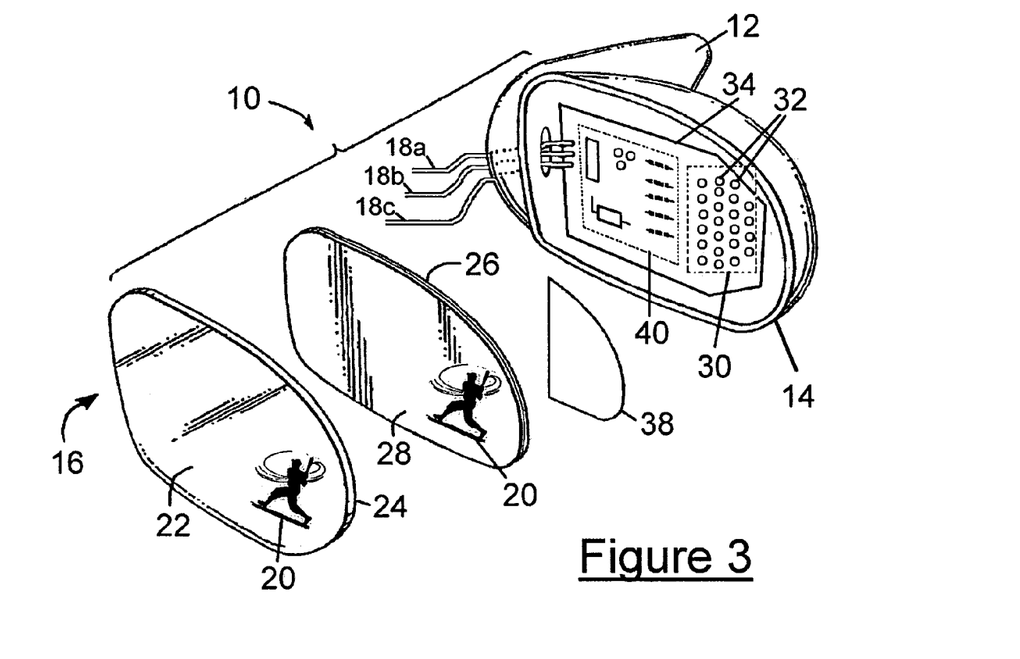
FIG. 3 is an exploded view of the exterior rearview mirror assembly shown in FIG. 1.
Figure 4:
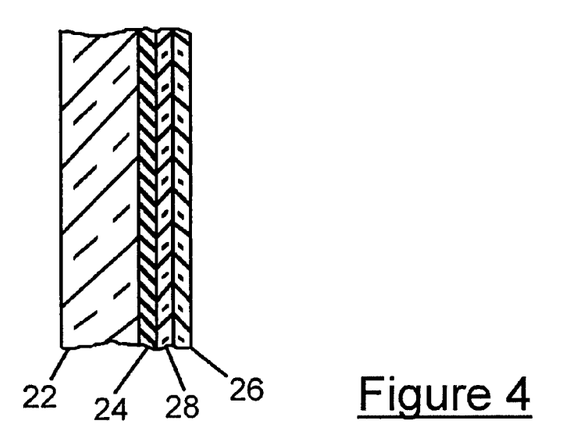
FIG. 4 is an enlarged cross-sectional view of a portion of the mirror element of the exterior rearview mirror assembly shown in FIG. 3.

Referring now to FIGS. 2-4, there are shown an enlarged view of the multidimensional graphical image 20 shown in FIG. 1, an exploded view of the exterior rearview mirror assembly 10 shown in FIG. 1, and an enlarged cross-sectional view of a portion of the mirror element 16 shown in FIG. 3, respectively.

Mirror element 16 includes a uniform reflective layer 24 over its entire rear surface (except of course where it is etched away to create an image 20) preferably including a combination of metallic elements such as silver and copper or a single metallic element such as aluminum. Mirror element 16 provides highly spectral reflection, preferably greater than 90% of the light incident thereon.

Anti-scatter layer 26, which in this embodiment is a layer of material such as a black laser engraving tape, is bonded to the back of the reflective surface 24 of the mirror element 16 by an adhesive layer 28. In this embodiment, substrate 22 is preferably made of transparent glass although other materials such as plastics may be used.

The optional anti-scatter layer 26 is included to improve the reflectivity of the mirror 16 and for safety by preventing pieces or fragments of substrate 22 from scattering in the event of impact and breakage during an accident. Anti-scatter layer 26 may also be of any number of conventional plastisol type thermoplastic layers that are etchable and which adhere firmly to the rear surface of the reflective layer 24 but retain a resilient, rubber-like consistency. If substrate 22 is made of a material such as plastic, then anti-scatter layer 26 may not be needed for safety but may still be included to improve the reflectivity of the mirror 16. In this instance, the choice of material for anti-scatter layer 26 may be simplified; it may even be a layer of dark paint that is compatible with a particular etching process.

Multidimensional graphical image 20 is etched through the anti-scatter layer 26, adhesive layer 28, reflective layer 24 and optionally a portion of glass substrate 22 by a process such as laser ablation, chemical means, or other etching processes well known in the art. An enlarged, two-dimensional view of image 20 is shown in FIG. 2. Some other examples of graphical images that can be etched include a skull and crossbones, a company logo and an image of a person.

Light source 30 preferably is diffused and is implemented as a plurality of light emitting diodes (LEDs) 32 along with any necessary electronic circuitry 40 on PCB 34, all of which are located in housing 14. The circuitry 40 on PCB 34 is used to power and control light source 30 and is described in more detail hereinbelow. A wide variety of light sources can be used as the light source 30 in any of the embodiments of the present invention, including LEDs or incandescent or fluorescent light bulbs, which can be utilized in combination with light pipes and fiber-optic cables. Even high powered electroluminescent technology may eventually be used.

Light diffusion may be accomplished in different ways. Some light sources naturally emit diffused light, but some sources such as certain types of LEDs 32 as those used in this embodiment require additional diffusion. A diffuser layer 38 (such as a 3M Corporation diffuser film) may be located between the light source 30 and the etched portion of the surface of the mirror element 16. Diffused light is preferred so that "hot spots" from individual LEDs 32 are not objectionable and to allow the etched image 20 to be viewed over a wide range of viewing angles at a uniform light level. To reduce costs, diffuser layer 38 need be placed behind the etched image 20 and held in place by any of several methods including attachment to housing 14 or by using adhesive (not shown) to attach diffuser layer 38 to anti-scatter layer 26 beyond the area of etched image 20.

Figure 5:
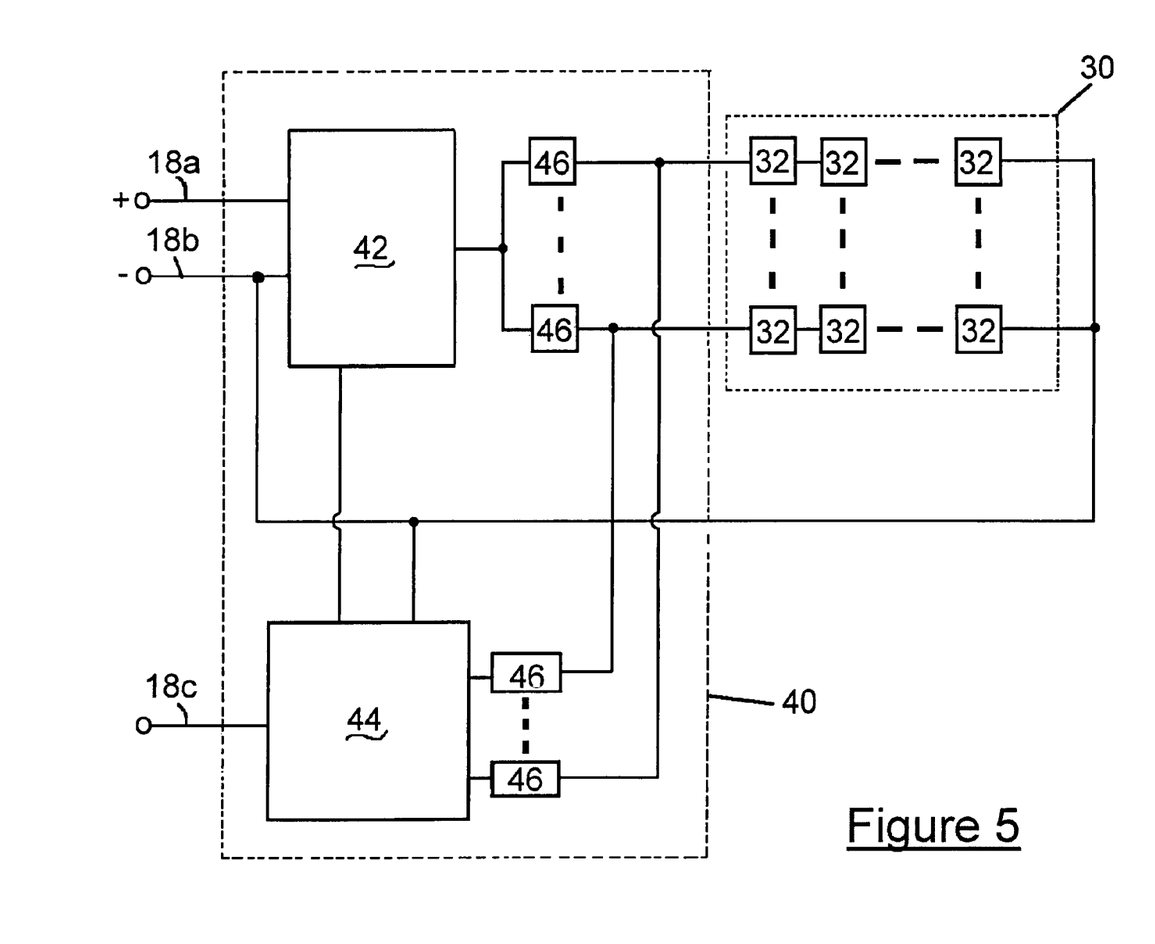
FIG. 5 is a schematic block diagram of one implementation of the circuitry and the LEDs of the light source on the PCB for the embodiment shown in FIG. 3.

Now referring to FIG. 5, there is shown a schematic block diagram of one implementation of the circuitry 40 and the LEDs 32 of light source 20 on PCB 34 for the embodiment shown in FIG. 3. Wires 18a and 18b provide the power interface and wire 18c provides the control interface from the vehicle (not shown) to the circuitry 40 for powering and controlling light source 30. The specific circuitry 40 used depends on how the light source 30 for a given application is required to operate. Circuitry 40 connected to the light source 30 comprises a plurality of subcircuits and components including: a power supply 42, a control circuit 44 and light intensity control (LIC) devices 46. Circuitry 40 has been designed to operate properly regardless of whether an external flashing circuit is present.

Power supply 42 includes a voltage regulator that takes a range of input voltages from a vehicle through wires 18a and 18b and provides at least one more precisely controlled output voltage to supply the needed voltages for the various parts of the circuitry 40 including the control circuit 44 and LEDs 32 of light source 30. Power supply 42 may comprise all discrete electronic components, but it typically includes at least one integrated circuit device, such as an LM2672 from National Semiconductor.

Light intensity control (LIC) devices 46, typically implemented as resistors, limit the current to the LEDs 32 and provide the desired relative light level. The values of LIC devices 46 may vary within an embodiment as required.

In this embodiment, during normal operation, the LEDs 32 operate at a first light level. This is accomplished by power supply 42 receiving power through wires 18a and 18b and supplying a regulated voltage to LEDs 32.

Through wire 18c, control circuit 44 determines when the LEDs 32 should receive additional current to increase the light output to a second light level. Control circuit 44 may include a timer device such as an LM555 device from National or Fairchild Semiconductor, or other components including a microprocessor. In this way, the mirror assembly 10 provides an additional function such as a turn signal, a brake light or a hazard indicator. It will be obvious to those skilled in the art that circuitry 40 could also be implemented to provide other electrical functions such as to turn off the running lights when a voltage appears on wire 18c. It should also be obvious that certain applications may require more than one control wire to implement electrical functions. Also, control circuit 44 may be activated remotely by including communications means such as radio frequency or infrared technology as a part of mirror assembly 10.

It is also well within the scope of this invention to implement variations that can include but not be limited to more than one color of light source 30 and more than one light source intensity to create a different lighting effect for a particular etched multidimensional graphical image 20. Control circuit 44 and power supply 42 may also include devices (not shown) such as a switch, a variable resistor (potentiometer) or a remote control to interrupt power to the mirror assembly 10 or to adjust the light level of light source 30. The switch or potentiometer may be entirely contained within the housing 14 or a portion of these devices may egress the housing 14 to allow actuation/adjustment. Also if a bright enough light source that uses very little power is available, mirror assembly 10 can be powered by an internal power source such as batteries, a photo-voltaic power source attached to the housing 14, or a combination of such sources instead of receiving power from the vehicle.

In secondary operation, when wire 18c is active, the exterior rearview mirror assembly 10 is coupled in parallel to a function that it emulates. Multiple functions may be implemented by using two or more etched images 20 individually illuminated when their associated function is operable. Multiple functions may also be implemented using a hierarchical approach. That is, an illuminated image 20 may be used for one function but may be superseded if another function is required. As should be understood, the vehicle electrical system may be configured to energize the respective etched graphical images 20 altogether or selectively to achieve a variety of different, visibly discernible outputs.

Figure 6:
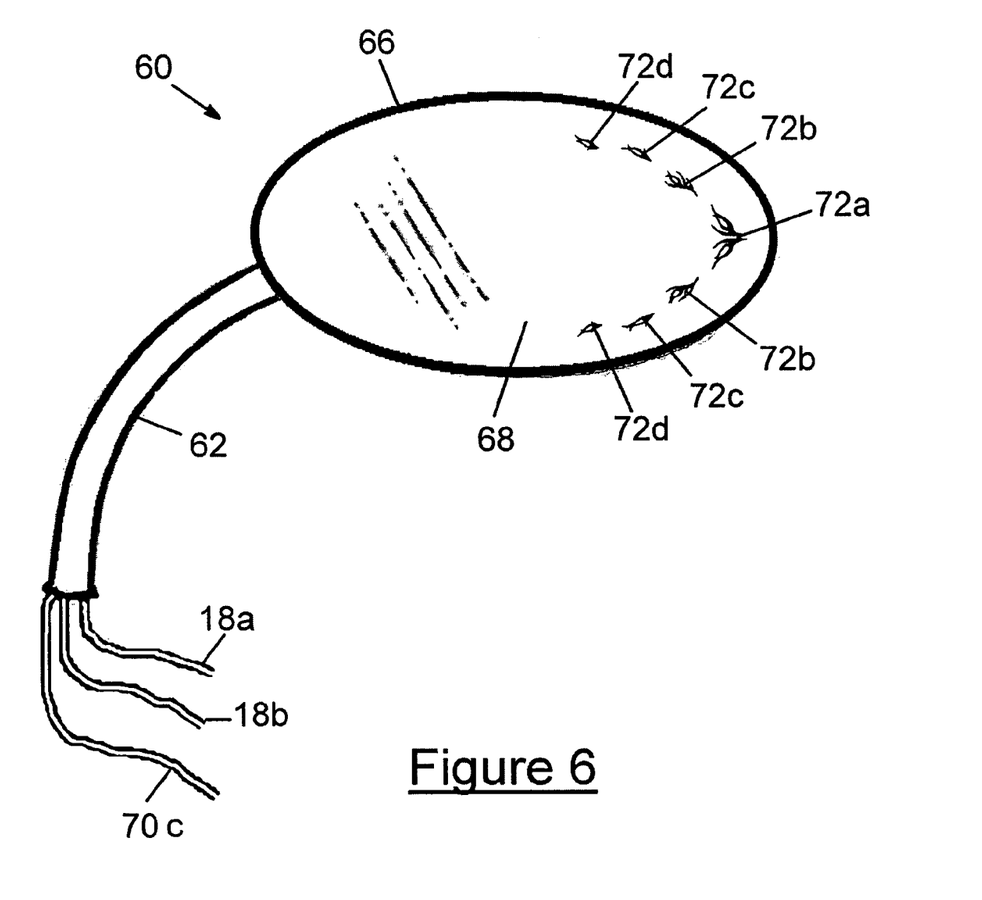
FIG. 6 is a front elevational view of an exterior rearview mirror assembly containing a plurality of multidimensional graphical images in accordance with an extension of the embodiment of FIG. 1.
Figure 7:
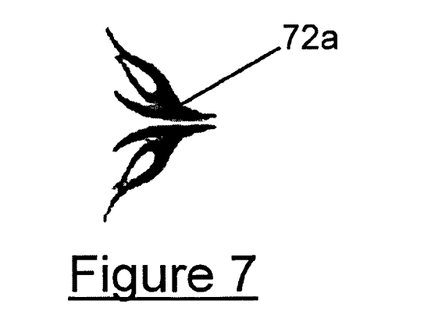
FIG. 7 is an enlarged two-dimensional view of the multidimensional graphical image shown in FIG. 6.

Referring now to FIGS. 6 and 7, there are shown a front elevational view of an exterior rearview mirror assembly 60 including a plurality of multidimensional graphical images 72a-72d in accordance with an extension of the embodiment of FIG. 1, and an enlarged, two-dimensional view of one of the multidimensional graphical images 72a, respectively.

Exterior rearview mirror assembly 60 is mountable to a motorized vehicle by a stem 62 and ball joint 64 (FIG. 8), which are commonly known in the industry. In this application, stem 62, ball and joint 64, and housing 66 are preferably formed of metallic materials. Mirror element 68 is mounted within housing 66. Wires 18a, 18b and 70c are used to provide power, ground and a control signal, respectively, to the mirror assembly 60.

The components in mirror element 68 are very similar in construction and function to those used in mirror element 16 in the embodiment shown in FIGS. 1-3. The component descriptions, therefore, of transparent substrate 22, reflective layer 24, anti-scatter layer 26, and adhesive layer 28 apply to substrate 74, reflective layer 76, anti-scatter layer 78, and adhesive layer 80 of mirror element 68 are not repeated here. The same applies to diffuser layer 38 (FIG. 2) and diffuser layer 82 of the present embodiment.

Multidimensional graphical images 72a-72d are etched through the reflective layer 76 and optionally the substrate 74 of mirror element 68, as aforementioned. Images 72a-72d are capable of being individually illuminated to provide running lights, decorative lighting, accent lighting, and effects such as sequencing. In this instance, images 72a-72d are representations of flames and are much more visible when illuminated.

Figure 8:
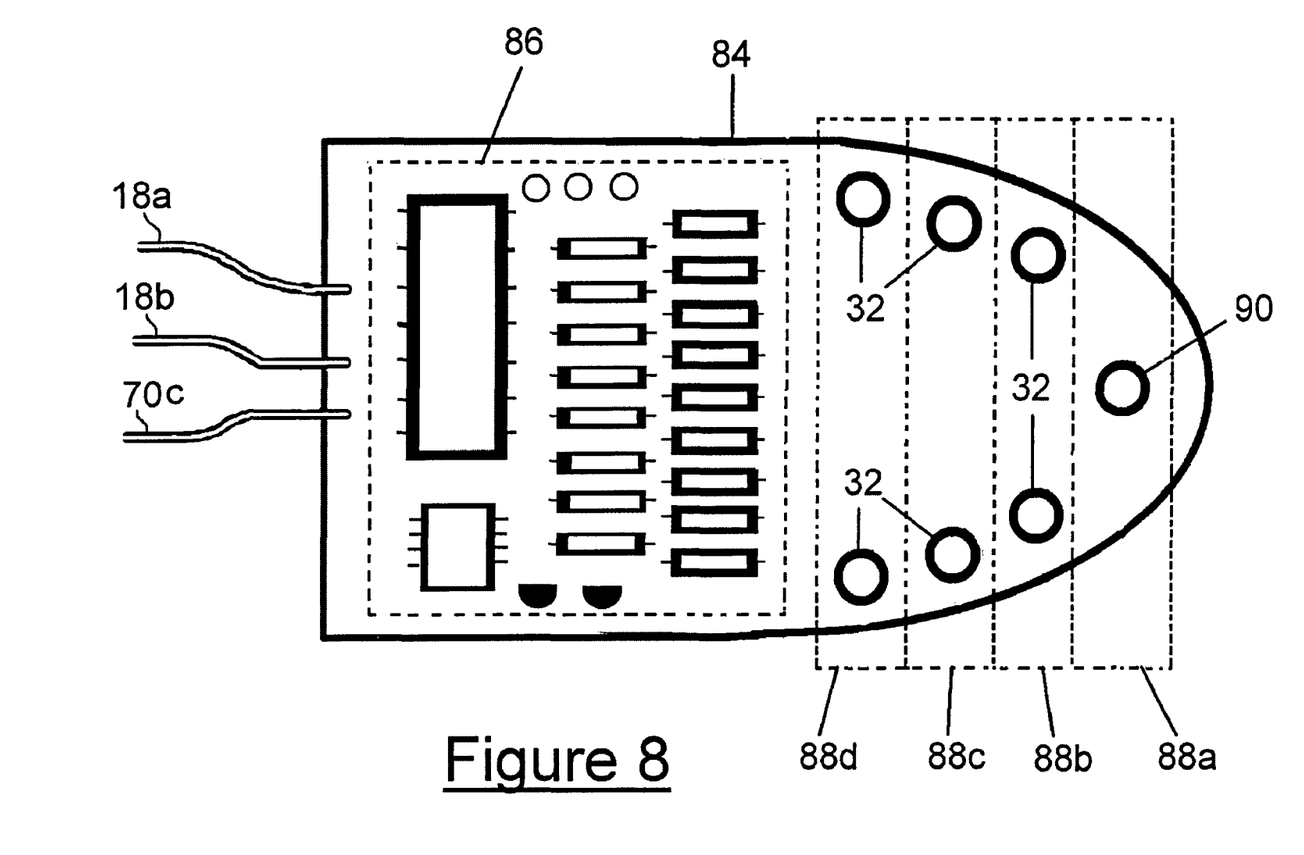
FIG. 8 is a front view of the PCB, including electronic circuitry and light sources for the embodiment shown in FIG. 6.

Now referring to FIG. 8, there is shown the PCB 84, electronic circuitry 86 and light sources 88a-88d for the embodiment shown in FIG. 6. Wires 18a, 18b, and 70c provide the interface from the vehicle (not shown) to the circuitry 86 to provide power to and control of the light sources 88a-88d. Light sources 88a-88d are positioned on PCB 84 to correspond to the plurality of etched graphical images 72a-72d (FIGS. 6 and 7). Light sources 88a-88d are diffused and are implemented as a plurality of light emitting diodes (LEDs) 32 and 90 along with any necessary electronic circuitry 86 on PCB 84, all of which are located in housing 66 (FIG. 6).

Figure 9:
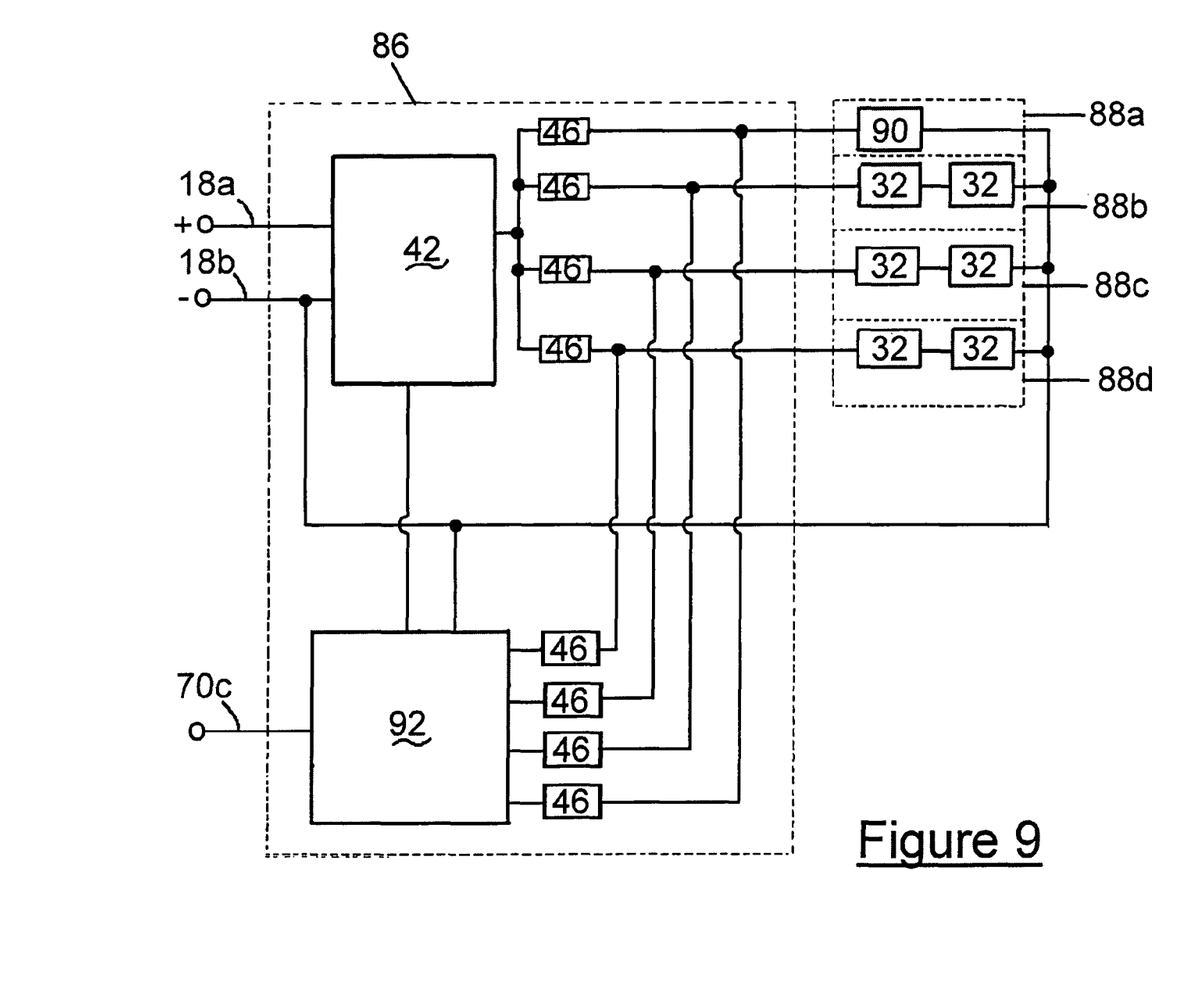
FIG. 9 is a schematic block diagram of one implementation of the circuitry and the LEDs of the light source on the PCB for the embodiment shown in FIG. 8.

Now referring to FIG. 9, there is shown is a schematic block diagram of one implementation of the circuitry 86 and the LEDs 32 and 90 of the light sources 88a-88d on the PCB 84 for the embodiment shown in FIG. 8. The specific circuitry 86 used again depends on how the light sources 88a-88d for a specific application are required to operate. In this embodiment circuitry 86 is designed to operate properly regardless of whether an external flashing circuit is present. Circuitry 86 includes a plurality of subcircuits, for example, power supply 42, control circuit 92 and LIC devices 46.

Through wire 70c, control circuit 92 determines when a specific light source 88a-88d being controlled by control circuit 92 should receive additional current to power light source 88a-88d to a second light level. Control circuit 92 may include a timer device such as an LM555 device from National or Fairchild Semiconductor, or other components including a microprocessor.

In this embodiment, during normal operation, light sources 88a-88d operate at a first light level. This is accomplished by power supply 42 receiving power through wires 18a and 18b and supplying a regulated voltage to light sources 88a-88d through LIC devices 46. In this embodiment, light source 88a comprises one higher powered LED 90 while light sources 88b-88d each comprise two LEDs 32.

When a voltage appears on wire 70c, control circuit 92 is programmed to initially provide additional current and therefore additional brightness to light source 88a for a certain period of time. Control circuit 92 then also facilitates power to light source 88b, then also to light source 88c and finally also to light source 88d, to provide a sequencing effect of the now brighter light sources 88a-88d. In this way, the mirror assembly 60b provides an additional function as a sequential turn signal. It will be obvious to those skilled in the art that circuitry 86 could also be implemented to provide other electrical functions such as to turn off the running lights. It should also be obvious that certain applications may require more than one control wire to implement electrical functions.

More than one light source 88a-88d may be used to illuminate a particular etched multidimensional graphical image 72a-72d. For example, light sources 88a and 88b may be located close enough to each other to illuminate image 72a.

Figure 10:
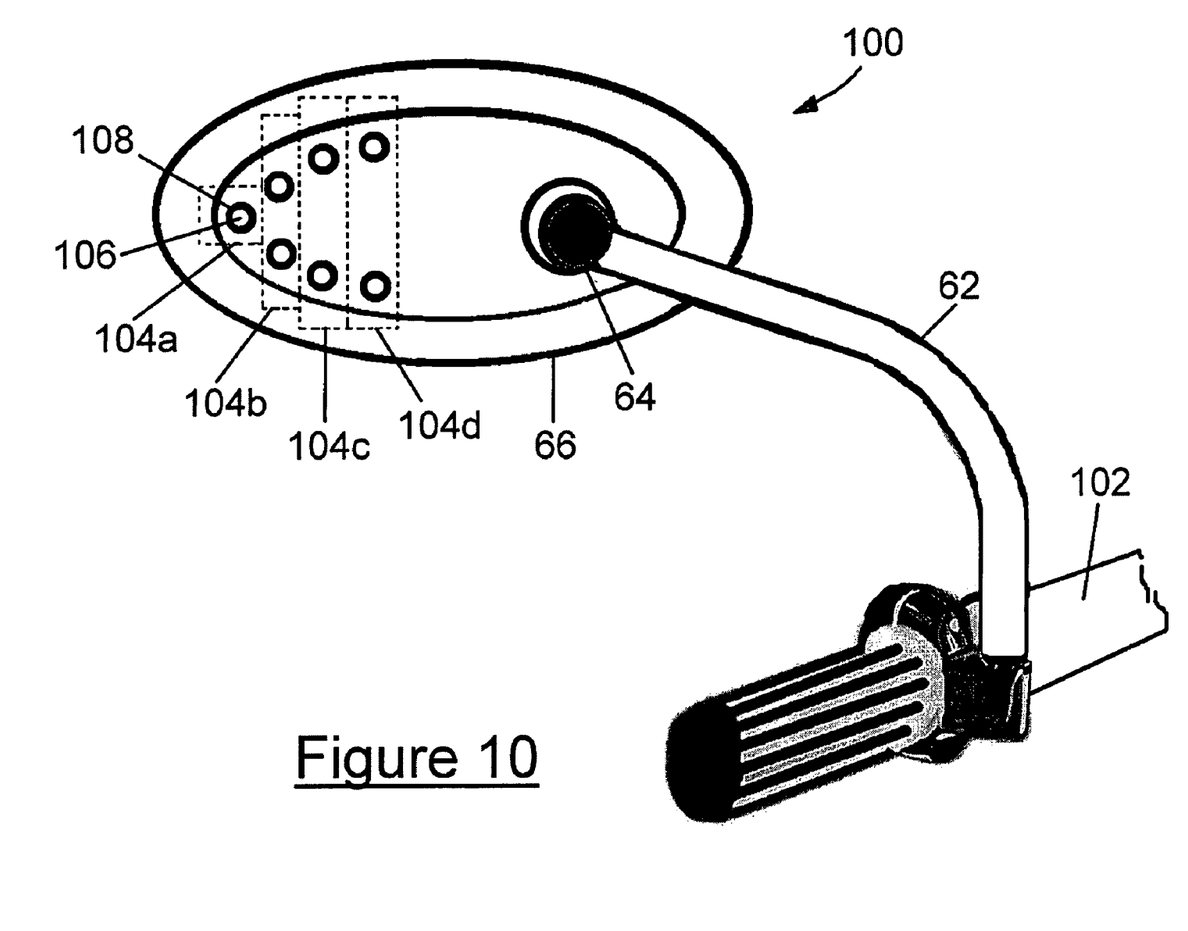
FIG. 10 is a rear elevational view of the exterior rearview mirror assembly shown in FIG. 6 attached to a handlebar of a motorcycle showing an additional array of additional array of light sources located on another surface of the housing in accordance with an extension of the embodiment of FIG. 6.

Referring now to FIG. 10, there is shown a rear elevational view of the exterior rearview mirror assembly 100 shown as an extension of the assembly 60 (FIG. 6) attached to a handlebar 102 of a motor vehicle (not shown). An additional array of light sources 104a-104d is located on the outer surface of the housing 66. Additional light sources 104a-104d are included to better highlight the vehicle to oncoming vehicles. Light sources 104a-104d may be controlled to parallel the functionality of the light sources 88a-88d shown in FIGS. 8 and 9 (i.e., to provide running lights, decorative lighting or accent lighting as the default condition, and to be capable of operating at a second light level, either higher or lower, to provide additional functionality), or they may be operated independently. In this embodiment, a second PCB (not shown) includes similar circuitry to circuitry 86 (FIGS. 8 and 9). Light sources 104a-104d are implemented as single LEDs 106, each located in a bezel 108 that egress the housing 66. While it is possible that the bezels 106 fit tightly to LEDs 104 and housing 66, in this embodiment an adhesive (not shown), such as silicone or hot glue, is used to ensure a secure fit and to exclude moisture, etc.

Figure 11:
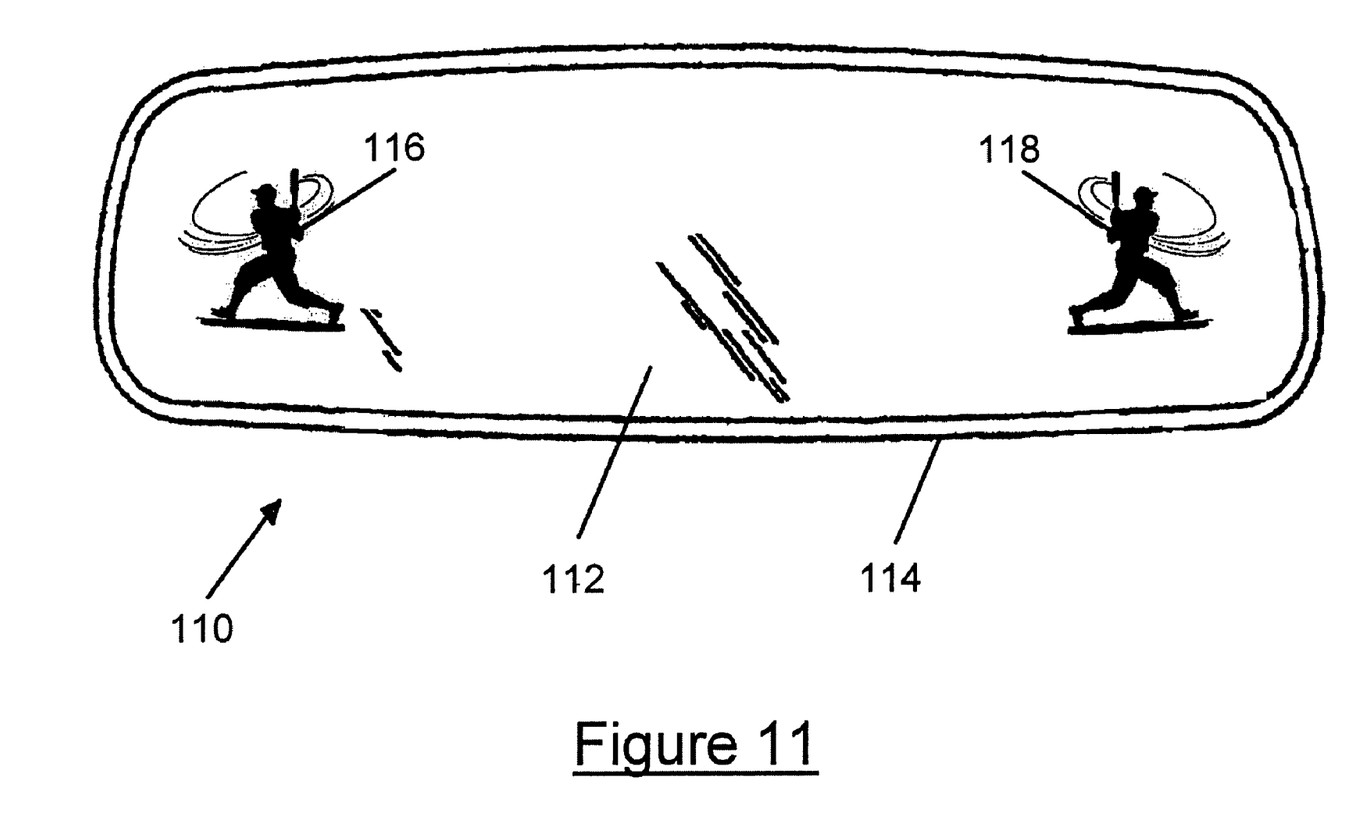
FIG. 11 is a front elevational view of an interior rearview mirror assembly including a mirror with illuminated etched multidimensional graphical images in accordance with another embodiment of the present invention.

Referring now to FIG. 11, there is shown a front elevational view of an interior rearview mirror assembly 110 including a mirror 112 with illuminated etched multidimensional graphical images 116 and 118 in accordance with another embodiment of the present invention. Interior rearview mirror assembly 110 is mountable to a motorized vehicle by means commonly known in the industry. In this interior application, housing 114 is preferably formed of a combination of metallic and polymeric materials that are functional yet aesthetically pleasing in the interior of a vehicle.

Mirror element 112 is mounted within a housing 114. Wires (not shown) are used to provide power and ground to the mirror assembly 110. Since the components in mirror element 112 and light sources are very similar in construction and function to those used in the exterior embodiments disclosed hereinabove, additional description of these elements is unnecessary. Multidimensional graphical images 116 and 118, with image 116 being the reverse image of image 118, are again formed as in previous embodiments and are again representations of a baseball player; images 116, 118 are much more visible when illuminated.

Since other modifications and changes varied to fit particular operating requirements and environments will be apparent to those skilled in the art, this invention is not considered limited to the examples chosen for purposes of this disclosure, and covers all changes and modifications which do not constitute departures from the true spirit and scope of this invention.

Having thus described the invention, what is desired to be protected by Letters Patent is presented in the subsequently appended claims.

What is claimed is:

1. A rearview mirror assembly for a motorized vehicle comprising:
   a) a mirror element, having a substantially uniform thickness and a major external surface with a reflective layer disposed on said major external surface thereof;
   b) at least one multidimensional graphical image etched through said reflective layer;
   c) electronic circuitry operatively connected to said vehicle for receiving power and a control signal therefrom; and
   d) at least one light source located within said housing and operatively connected to said circuitry for the energization thereof, said at least one light source positioned to illuminate said at least one multidimensional graphical image continuously during normal operation at least a first, discrete, non-zero light level in the absence of said control signal to provide a principally aesthetic display of said multidimensional graphical image, and to intermittently illuminate at least a portion of said at least one multidimensional graphical image at another discrete, non-zero light level in response to said control signal to provide a principally informational display of said multidimensional graphical image.

2. A rearview mirror assembly for a motorized vehicle comprising:
   a) a housing for mounting to the exterior of said vehicle;
   b) a mirror element, having a substantially uniform thickness and a major external surface with a reflective layer disposed on said major external surface thereof;
   c) at least one multidimensional graphical image etched through said reflective layer;
   d) electronic circuitry operatively connected to said vehicle for receiving power and a control signal therefrom; and
   at least one light source located within said housing and operatively connected to said circuitry for the energization thereof, said at least one light source positioned to illuminate said at least one multidimensional graphical image continuously during normal operation at least a first, discrete, non-zero light level in the absence of said control signal to provide a principally aesthetic display of said multidimensional graphical image, and to intermittently illuminate at least a portion of said at least one multidimensional graphical image at another discrete, non-zero light level in response to said control signal to provide a principally informational display of said multidimensional graphical image.

3. The rearview mirror assembly as recited in claim 2, wherein said at least one light source comprises a printed circuit board (PCB) and a plurality of light emitting diodes (LEDs) mounted thereon.

4. The rearview mirror assembly as recited in claim 2, further comprising a diffuser layer positioned between said at least one light source and said at least one multidimensional graphical image.

5. The rearview mirror assembly as recited in claim 2, wherein said electronic circuitry comprises a control circuit and a power supply circuit.

6. The rearview mirror assembly as recited in claim 2, wherein said circuitry operates one of said at least one light source in a first manner and operates a second one of said at least one light source in a manner different from said first manner.

7. The rearview mirror assembly as recited in claim 6, wherein said circuitry comprises at least one function from the group: operate two of said at least one light source in sequence, operate two of said at least one light source in parallel, operate two of said at least one light source independently of each other.

8. The rearview mirror assembly as recited in claim 6, wherein said circuitry independently controls the light level of at least two of said at least one light source.

9. The rearview mirror assembly as recited in claim 2, further comprising an anti-scatter layer of material attached to said reflective layer.

10. The rearview mirror assembly as recited in claim 2, wherein said at least one multidimensional image is etched by one of the group: laser ablation and chemical means.

11. The rearview mirror assembly as recited in claim 2, further comprising a second light source located within said housing and light from which is viewable from outside of said housing.

12. The rearview mirror assembly as recited in claim 11, wherein said circuitry controls at least one of the group: said second light source and additional circuitry operatively connected thereto.

13. A rearview mirror assembly for a motorized vehicle comprising:
   a) a housing for mounting to the exterior of said vehicle;
   b) a mirror element having a substantially uniform thickness and a major external surface with a reflective layer on said major external surface thereof, said reflective layer further comprising at least one section that is continuous and at least one additional section that is partially continuous;
   c) electronic circuitry operatively connectable to said vehicle for receiving power and a control signal therefrom; and
   d) at least one light source located within said housing and operatively connected to said circuitry for the energization thereof, said at least one light source positioned to illuminate said at least one additional section continuously during normal operation at least a first, discrete, non-zero light level in the absence of said control signal to provide a principally aesthetic display of said at least one additional section, and to intermittently illuminate at least a portion of said at least one additional section at another discrete, non-zero light level in response to said control signal to provide a principally informational display of said at least one additional section.

14. The rearview mirror assembly as recited in claim 13, wherein said electronic circuitry comprises at least one electrical component from the group: semiconductors, resistors, capacitors and switches.

\* \* \* \* \*